United States Patent
Carroll et al.

(10) Patent No.: US 11,579,940 B2
(45) Date of Patent: Feb. 14, 2023

(54) TECHNIQUES AND ARCHITECTURES FOR MANAGING GLOBAL INSTALLATIONS AND CONFIGURATIONS

(71) Applicant: salesforce.com, inc., San Francisco, CA (US)

(72) Inventors: Seamus Carroll, Vancouver (CA); Morgan Galpin, Vancouver (CA); Adam Matthew Elliott, Burnaby (CA); Chris Mueller, Vancouver (CA); Graham Campbell, Vancouver (CA)

(73) Assignee: salesforce.com, inc., San Francisco, CA (US)

( * ) Notice: Subject to any disclaimer, the term of this patent is extended or adjusted under 35 U.S.C. 154(b) by 328 days.

(21) Appl. No.: 16/727,635

(22) Filed: Dec. 26, 2019

(65) Prior Publication Data

US 2020/0326991 A1 Oct. 15, 2020

Related U.S. Application Data

(60) Provisional application No. 62/832,849, filed on Apr. 11, 2019.

(51) Int. Cl.
  *G06F 9/50* (2006.01)
  *H04L 9/40* (2022.01)
  *G06F 16/28* (2019.01)
  *G06Q 10/0631* (2023.01)

(52) U.S. Cl.
  CPC .......... *G06F 9/5083* (2013.01); *G06F 16/285* (2019.01); *G06Q 10/0631* (2013.01); *H04L 63/101* (2013.01)

(58) Field of Classification Search
  None
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelii et al. |
| 5,831,610 A | 11/1998 | Tonelii et al. |
| 5,873,096 A | 2/1999 | Lim et al. |

(Continued)

*Primary Examiner* — Adam Lee
(74) *Attorney, Agent, or Firm* — Kwan & Olynick LLP (57) ABSTRACT

A publish and subscribe architecture can be utilized to manage records, which can be used to accomplish the various functional goals. At least one template having definitions for managing production and consumption of data within an unconfigured group of computing resources is maintained. Records organized by topic collected from multiple disparate previously configured producers are utilized to initiate configuration of the unconfigured group of computing resources. Records within a topic are organized by a corresponding topic sequence. A first portion of the computing resources are configured as consumers based on the at least one template. The consumers to consume records at a pace independent of record production. A second portion of the computing resources are configured as producers based on the at least one template. The producers to produce records at a pace independent of record consumption.

21 Claims, 4 Drawing Sheets

(56) References Cited

U.S. PATENT DOCUMENTS

| | | | |
|---|---|---|---|
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,185,613 B1* | 2/2001 | Lawson | G06F 9/542 709/224 |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 7,711,783 B1* | 5/2010 | Violleau | H04L 63/101 709/206 |
| 9,852,186 B2* | 12/2017 | Herwadkar | G06F 16/9024 |
| 10,673,969 B2* | 6/2020 | Bheemarajaiah | H04L 67/568 |
| 2001/0044791 A1 | 11/2001 | Richter et al. | |
| 2002/0022986 A1 | 2/2002 | Coker et al. | |
| 2002/0000355 A1 | 3/2002 | Brodersen et al. | |
| 2002/0029161 A1 | 3/2002 | Brodersen et al. | |
| 2002/0029376 A1 | 3/2002 | Ambrose et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachadran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0225857 A1* | 12/2003 | Flynn | H04L 67/55 709/217 |
| 2004/0001092 A1 | 1/2004 | Rothwein et al. | |
| 2004/0010489 A1 | 1/2004 | Rio | |
| 2004/0015981 A1 | 1/2004 | Coker | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0203949 A1* | 9/2005 | Cabrera | H04L 67/02 |
| 2005/0204051 A1* | 9/2005 | Box | H04L 67/02 709/230 |
| 2006/0029054 A1* | 2/2006 | Breh | G06F 8/61 370/385 |
| 2008/0052727 A1* | 2/2008 | Todd | H04L 12/1859 719/313 |
| 2009/0177744 A1 | 7/2009 | Marlow et al. | |
| 2012/0079066 A1* | 3/2012 | Li | H04L 67/26 709/217 |
| 2014/0082744 A1* | 3/2014 | Behforooz | G06Q 50/01 726/27 |
| 2014/0143214 A1* | 5/2014 | Kohl | G06F 16/27 707/694 |
| 2014/0201135 A1* | 7/2014 | Smid | G06F 16/27 707/610 |
| 2015/0019655 A1* | 1/2015 | Kizhakkiniyil | H04L 67/2819 709/206 |
| 2015/0200887 A1* | 7/2015 | Cuomo | H04L 67/06 709/206 |
| 2015/0254328 A1* | 9/2015 | Dereszynski | G06Q 30/0277 707/739 |
| 2016/0182652 A1* | 6/2016 | Bevilacqua | G06F 9/542 709/203 |
| 2016/0219089 A1* | 7/2016 | Murthy | H04L 65/4076 |
| 2017/0041352 A1* | 2/2017 | Martens | H04L 65/1069 |
| 2017/0078423 A1* | 3/2017 | Diester | H04L 67/567 |
| 2017/0126603 A1* | 5/2017 | Chen | H04L 67/26 |
| 2017/0132068 A1* | 5/2017 | Parra | H04L 41/00 |
| 2017/0300966 A1* | 10/2017 | Dereszynski | G06Q 30/0254 |
| 2017/0339238 A1* | 11/2017 | Qin | H04L 51/00 |
| 2018/0091586 A1* | 3/2018 | Auradkar | H04L 67/1095 |
| 2018/0167476 A1* | 6/2018 | Hoffner | H04L 67/26 |
| 2018/0213018 A1* | 7/2018 | Madani | H04L 67/561 |
| 2018/0248771 A1* | 8/2018 | Côté et al. | H04L 41/5009 |
| 2019/0044818 A1* | 2/2019 | Nolan | H04W 8/005 |

(56) References Cited

U.S. PATENT DOCUMENTS

| | | | | |
|---|---|---|---|---|
| 2019/0073373 | A1* | 3/2019 | Surale | H04L 63/083 |
| 2019/0079818 | A1* | 3/2019 | Handa | G06F 11/0778 |
| 2019/0102266 | A1* | 4/2019 | Park | G06Q 11/1658 |
| 2019/0130290 | A1* | 5/2019 | Kerber | G06N 5/022 |
| 2019/0222640 | A1* | 7/2019 | Tock | H04L 67/42 |
| 2019/0258756 | A1* | 8/2019 | Minwalla | G06N 20/20 |
| 2019/0306121 | A1* | 10/2019 | Anderson | H04L 63/0236 |
| 2019/0377816 | A1* | 12/2019 | McCluskey | G06F 16/254 |
| 2020/0042365 | A1* | 2/2020 | Tanna | G06F 9/465 |
| 2020/0111033 | A1* | 4/2020 | Mahajan | G06Q 10/087 |
| 2020/0174854 | A1* | 6/2020 | Warshavsky | G06F 9/45558 |
| 2020/0183603 | A1* | 6/2020 | Takla | G06F 3/0655 |
| 2020/0293803 | A1* | 9/2020 | Wajs | G06K 9/6217 |
| 2020/0293920 | A1* | 9/2020 | Chung | G06F 16/9024 |
| 2020/0402058 | A1* | 12/2020 | Zhou | G06Q 20/3276 |
| 2021/0149752 | A1* | 5/2021 | Burroughes | G06F 16/21 |

* cited by examiner

TECHNIQUES AND ARCHITECTURES FOR MANAGING GLOBAL INSTALLATIONS AND CONFIGURATIONS

TECHNICAL FIELD

Embodiments relate to techniques for managing installations and/or configurations of, for example, data centers. More specifically, embodiments relate to distributed architectures and mechanisms to provide efficient and consistent configuration functionality utilizing publish/subscribe concepts that can scale efficiently.

BACKGROUND

Configuring and/or managing data centers (or other high-volume data resources) can be a complex, expensive and/or time-consuming venture. Even currently automated functionality must be manually initiated or managed. Increased complexity and time requirements result in increased costs and increased likelihood of error. Thus, more efficient architectures and/or techniques would be beneficial.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following description, numerous specific details are set forth. However, embodiments of the invention may be practiced without these specific details. In other instances, well-known structures and techniques have not been shown in detail in order not to obscure the understanding of this description.

The following description provides specifics in terms of platforms (e.g., salesforce) and supporting infrastructure (e.g., Apache Kafka or a variation thereof); however, the techniques, mechanisms, architectures and functionality described and claimed herein are not limited to those specific implementation details. Various platforms and features available from, for example, salesforce.com can be used to connect data from a global network of internal and external entities to enable products that improve customer access to services and data.

However, this has resulted in increased complexity related to on-boarding of clients as well as ongoing and/or expanding operations. Managing a relatively small number of integrations and clusters can be achieved by a team utilizing various tools, but this standard approach is not sustainable at the global level. Various embodiments provide improved functionality by utilizing the concepts of producers and consumers that can operate using records that are managed by topics. Various other labels for these concepts and alternative architectures are described in greater detail below.

In various embodiments described herein one or more of the following core functionalities can be provided to enable a more efficient solution. 1) Enabling customers to self-service their producers and consumers using the concepts of Sources and Sinks. Sources and Sinks are an abstraction layer that can span clusters (e.g., Kafka clusters) which result in the automatic management of, for example, topics, access control lists (ACLs), quotas and mirroring to, for example, satisfy global on-boarding with a single command. 2) Providing global visibility on cluster health and state from a single interface (e.g., operations portal). 3) Ensuring global state marches towards desired state using event-driven mechanisms.

In general, a publish and subscribe architecture can be utilized to manage records, which can be used to accomplish the various functional goals, for example, efficient on-boarding. In some embodiments, Apache Kafka can be utilized to provide some or all of the publish and subscribe architecture. In alternate embodiments, other publish and subscribe architectures can be utilized. With these types of architectures, data consumers (data sinks) can receive data according to their own schedule in a flexible and efficient way.

Figure 1:
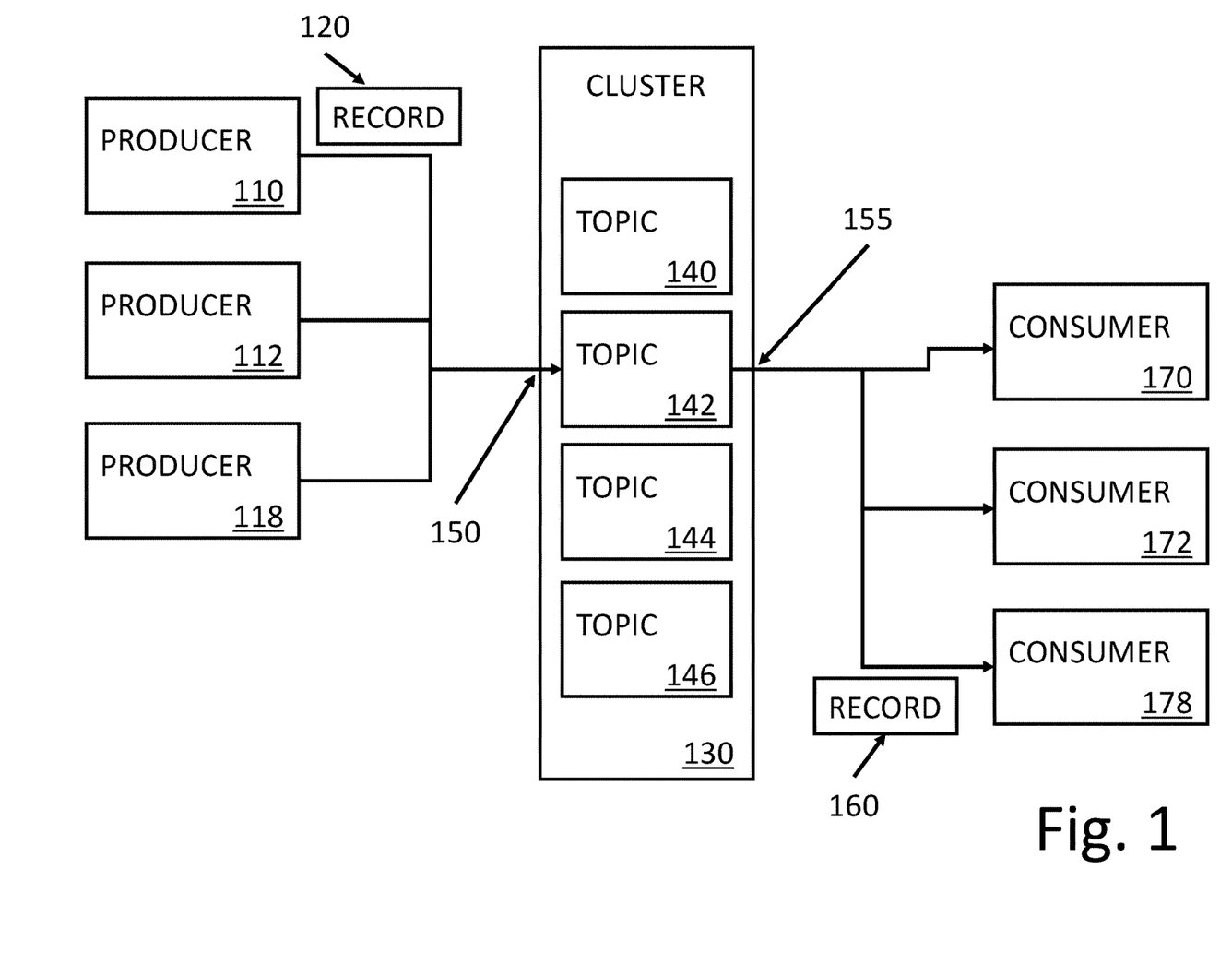
FIG. 1 is a block diagram of one embodiment of an architecture that can be utilized to provide the functionality described herein.

FIG. 1 is a block diagram of one embodiment of an architecture that can be utilized to provide the functionality described herein. In the example of FIG. 1, one or more producer entities (e.g., 110, 112, 118) can produce records (e.g., 120, 160) that can be utilized by consumer entities (e.g., 170, 172, 178). As mentioned above, this architecture can be utilized, for example, to accomplish goals such as onboarding of clients in complex multi-client environments or configuration of devices in complex environments like data centers.

Producers can be various disparate sources that provide records to cluster 130 that can organize records into topics (e.g., 140, 142, 144, 146) that can be utilized to provide the appropriate records to consumers. While the example of FIG. 1 has relatively small numbers, any number of producers, records, clusters, topics and consumers can be supported.

The example of FIG. 1 includes a single cluster; however, any number of clusters can be supported. For example, records can be gathered by one or more local clusters (that are local to the producers of the records) and can be sent to a data center cluster (or other higher-level cluster) to be distributed to consumers and/or to lower-level clusters more local to the consumers.

As mentioned above, Apache Kafka can be utilized to provide some of the basic functionality described herein. In alternate embodiments, other similar tools can be utilized. In an example Kafka (or similar)-based embodiments records, topics, consumers, producers, brokers, logs, partitions and clusters can be utilized. In one embodiment, records (e.g., 120, 160) are immutable and can have a key, a value and a timestamp (not illustrated in FIG. 1). In one embodiment, each topic (e.g., 140, 142, 144, 146) has an associated log that functions as the storage structure of the topic. In some embodiments, a topic log can be broken into partitions and segments.

In one embodiment, a producer can produce streams of data records that can be received by cluster 130, for example, via producer application program interface (API) 150. In one embodiment, consumers can consume a stream of data records, for example, via consumer API 155. In one embodiment, a broker is a server (or similar) that runs one or more topic partitions. In various embodiments, clusters can consist of many brokers on many servers.

In one embodiment, records are appended from the producer end of the topic log. In various embodiments, a topic log can consist of many partitions spread over multiple files that can be on multiple cluster nodes.

Consumers read from topic logs at their respective cadences and can consume records (e.g., via offset) within the topic log. In various embodiments, each consumer can track offset(s) from where they left off reading. In some embodiments, topic log partitions can be distributed across multiple nodes in a cluster for performance and scalability. In some embodiments, partitions can be replicated to provide failover.

As described in greater detail below, records can be generated by various sources, managed in one or more clusters and consumed in a manner to provide self-managed onboarding to one or more environments. As one example, one or more servers within a data center (or even a new data center) can be configured by consuming records from an appropriate topic.

In various embodiments sources and sinks of data can be defined by templates that can be applied globally or to one or more data centers that can require replication that can control accesses, which is a new control on data flows. Further, orchestration of, for example, Kafka clusters and giving customers ability to define future states. Thus, centralized application command and control can be provided, which is new and useful. Further, linking to command and control can be supported.

The techniques described herein support user self-service with respect to devices or groups of devices (e.g., data centers), which eliminates or reduces the need for manual administration of these devices. Further, templated integrations can be supported that can allow new groups of devices to come online automatically configured. In various embodiments, data sources and data sinks can be conceptualized, which abstracts away from the standard "building blocks" of Kafka. Conceptually, the standard use of topics, producer ACLs, consumer ACLs and mirroring patterns are not utilized. Rather, in one embodiment, a source is defined in one group of devices (or system) and a sink is defined in another group of devices (or a different system) manages the configuration of core building blocks.

In various embodiments, a record management agent can run in one or more data centers (or other groups of computing resources) and can function to collect and manage distribution of records within the data center (or resource group). The record management agent can communicate records and/or related information through various application program interfaces (APIs). As described in greater detail below, in some embodiments, specific operations (or groups of operations) can be utilized to accomplish these tasks.

In various embodiments, the following concepts (that may have corresponding commands) can be provided. An "ENSURE_SOURCE" command (or similar concept) can be utilized to onboard or manage a producer (e.g., 110, 112, 118) including creating resources needed by the producer, and a "DECOM_SOURCE" command (or similar concept) can be utilized to remove access for the producer including decommissioning resources needed by the producer. Similarly, an "ENSURE_SINK" command (or similar concept) can be utilized to onboard or manage a consumer (e.g., 170, 172, 178) including creating resources needed by the consumer, and a "DECOM_SINK" command (or similar concept) can be utilized to remove access for the consumer including decommissioning resources needed by the consumer.

A source is a producer of data with an associated scope that defines the granularity with which topics are to be created. The scope can be, for example, per pod or per data center. A sink is a logical consumer of data and can be applied to a source. In an example Apache Kafka based embodiment, sources and sinks can be associated with a principal. In one embodiment, topics that fulfil a source have Describe and Write ACLs, and topics that fulfil a sink have Describe and Read ACLs.

In some embodiments, the ENSURE_SOURCE command can include a name (a label for the source), a principal (one or more principals that can produce data), a namespace (to be prefixed to created topics), a channel name (to be added to the channel portion of the topic), a channel format (a formatting guide for the channel, for example, #suffix# <==>${superpod}.${pod}.${channelName}), a scope (the dimensions by which topics should be created, for example, site, pod, superpod), a pod environment (that can be used with the scope is "pod," for example, production or sandbox), a number of partitions for each topic, and/or any specific overrides. Other and/or different formats and elements can also be supported.

The following is an example onboard logbus producer:

```
{
    "principal":"logbus", // PKI cert also deployed to core app hosts
    "name":"logbus-pod-prod",
    "namespace":"sfdc.prod.logbus",
    "scope":"pod",
    "podEnvironment":"production",
    "numPartitions":15,
    "channelName":"logs.coreapp",
    "channelFormat":"#suffix#",
    "overrides":{
        "retention.ms":"345600000",
        "max.message.bytes":"1048576",
        "retention.bytes":"219902325555" // 205 GiB per partition
    }
}
```

The following is an example onboard splunk consumer:

```
{
    "principal":"splunk",
    "name":"splunk coreapp prod logs consumer",
    "scope":"aggregate",
    "sources":[
        {
            "principal":"logbus",
            "name":"logbus-pod-prod"
        }
    ]
}
```

These are just one example each of producers and consumers. Other configurations, types, structures, specifics can be supported.

In some embodiments, the ENSURE_SINK command can include a name (a label for the sink), a principal (one or more principals that can consume data), and/or a scope (the dimensions by which topics should be created, for example, site, aggregate). Other and/or different formats and elements can also be supported.

As described in greater detail below, the techniques and architectures described herein can be utilized to provide customer self-service in terms of simple and timely onboarding, clear visibility about resources, lifecycle controls with guardrails and/or access controls. In one embodiment, the automation techniques described herein cannot be utilized to automate the exfiltration of data. These techniques, therefore, provide improved cluster visibility, cluster self-healing and/or improved, automatic load balancing.

As used herein, the event-source design architecture described can be used for configuration, which is a new and different approach to system/data center configuration. In one embodiment, all commands going to the system are stored centrally, and each cluster controller, which are distributed globally, checks these commands to determine if there is work to be done locally. This asynchronous model enables the eventual march forward of consistency and unblocks new sites coming online. A new site, for example, proceeds through the ordered list of commands to be configured in the same way as other sites.

That is, the system uses the event sourcing design pattern to asynchronously march global actual state to desired state. Desired state can be changed when an external command is issued to the system such as create-source or create-sink. New commands result in local cluster controllers detecting a difference between actual and desired state within their purview. The local controller immediately begins the work of modifying it's clusters to remediate the deltas. Eventually the global network of controllers completes which means the global state satisfies all commands. Communication within the system is via an immutable stream of events stored centrally. The events never expire and can be replayed to satisfy unexpected future business requirements.

In one embodiment, when a new cluster comes online the local controller will detect that its actual state is empty which contradicts the desired state. The local controller can remediate the deltas by updating the new cluster with topics, ACLs and quotas to support the desired set of sources and sinks. Various embodiments can utilize the architecture as illustrated in FIG. 2.

Figure 2:
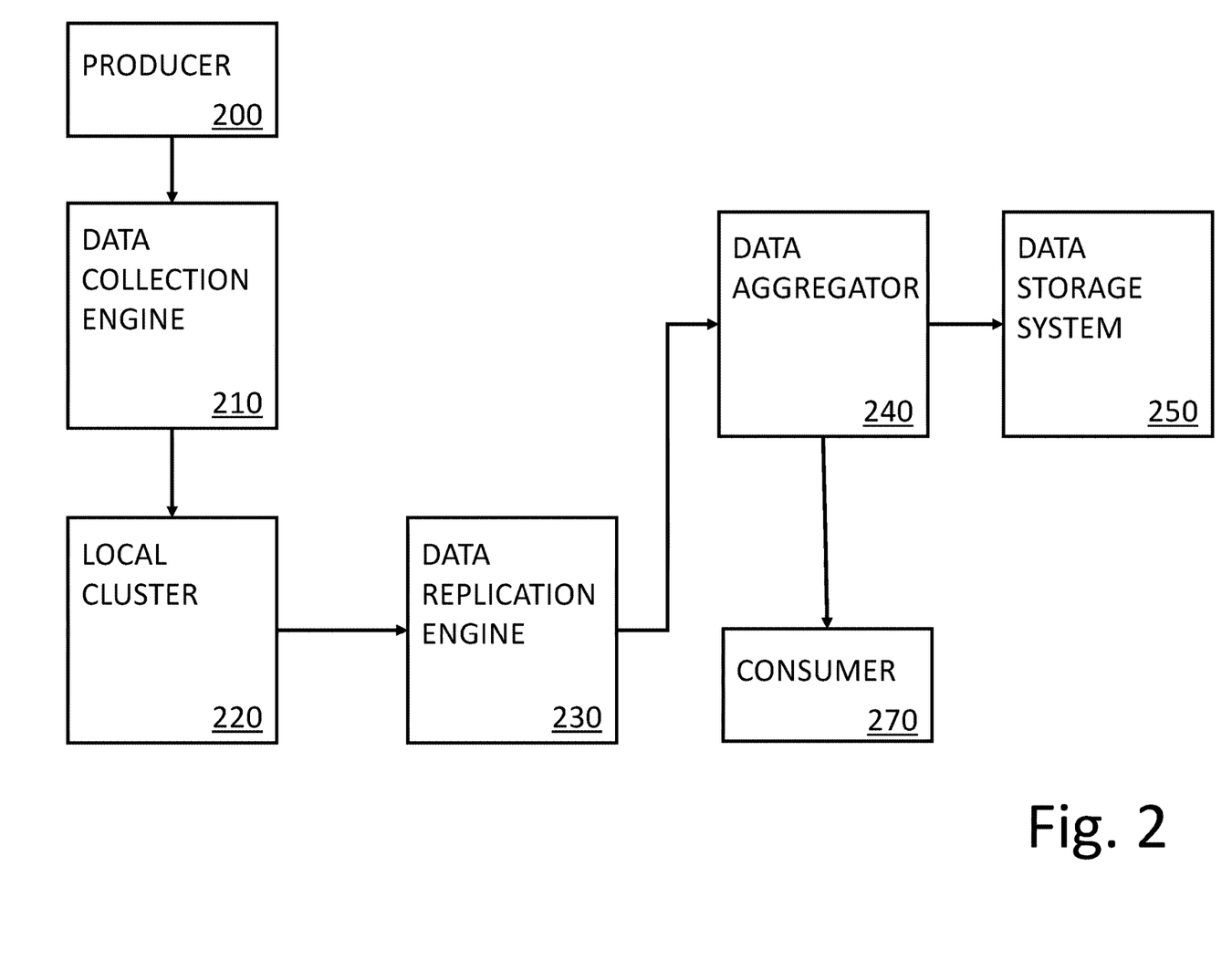
FIG. 2 is a block diagram of one embodiment of a distributed architecture that can be utilized to provide the functionality described herein.

FIG. 2 is a block diagram of one embodiment of a distributed architecture that can be utilized to provide the functionality described herein. In some embodiments, the same operations are applied to every pod. This simplifies configuration and can also be implemented using the publish-subscribe techniques described herein. In some embodiments, at least the data collection engine, local cluster and data replication engine are included in every data center.

Producer 200 can be any type of producer as described above with respect to FIG. 1. Further, any number of producers can be supported. Data collection engine 210 functions to collect records (e.g., logs) from producers (e.g., 200). Conceptually, this is the start of the pipeline and can be used as a reference point for the measurement of completeness.

In various embodiments, local cluster 220 functions as a data processor that receives records from one or more data collection engines and publishes them to data replication engine 230. Local cluster 220 can be, for example, a Kafka cluster, co-located in each data center that receives records from data collection engine 210 and manages the records in topics before the records are published to data replication engine 230.

In one embodiment, data replication engine 230 functions to replicate records from local cluster 220 to data aggregator 240. In one embodiment, data aggregator 240 is located in a secure location and can receive records from any number of local clusters and data replication engines. In one embodiment, data aggregator 240 can be a Kafka cluster that manages received records in topics.

In some embodiments, one or more consumers (e.g., 270) can consume records from one or more topics as provided by data aggregator 240. In some embodiments, records from data aggregator 240 can be stored in data storage system 250. For example, a MapReduce job (e.g., Apache Kafka Camus) can consume records from data aggregator 240 and serialize them for storage in data storage system 250, which can be, for example, a large-scale distributed Apache Hadoop ecosystem. In some embodiments, records can be stored in data storage system 250 before they are post processed for consumers.

In one embodiment, the ENSURE_SOURCE command can be utilized to create per-pod producer topics in local cluster 220. In one embodiment, the ENSURE_SOURCE command can also be utilized to set producer quotas in local cluster 220. In one embodiment, the ENSURE_SOURCE command can be utilized to set producer ACLs for local cluster 220.

In one embodiment, the ENSURE_SINK command can be utilized to create per-pod topics in data aggregator 240. In one embodiment, the ENSURE_SINK command can be utilized to set producer quotas and/or set producer ACLs in data replication engine 230. In one embodiment, the ENSURE_SINK command can be utilized to set consumer quotas and/or set consumer ACLs in data replication engine 230.

In one embodiment, the ENSURE_SINK command can be utilized to notify data replication engine 230 to mirror pod topics to data aggregator 240. In one embodiment, the ENSURE_SINK command can be utilized to create consumer quotas and/or set consumer ACLs for consumer 270. Thus, the architecture of FIGS. 1 and 2 can provide a flexible and scalable environment in which data can be managed and utilized, for example, for onboarding or configuration purposes. A few use case examples are provided herein; however, the concepts have broader applicability than the few examples included herein.

As discussed above, sources and sinks of data can be defined by templates that can be applied globally or to one or more data centers. Thus, application of the template definitions can initiate (or manage) the production and consumption of data (e.g., configuration operations) within a new data center (or other complex system) based on information from any number of sources. By managing the configuration information in topics, the appropriate ordering can be consistently provided. Further, templates that can require replication that can control accesses, which is a new control on data flows. Further, orchestration of, for example, Kafka clusters can give customers ability to define future states through centralized command and control.

The techniques described herein support user self-service with respect to devices or groups of devices (e.g., data centers), which eliminates or reduces the need for manual administration of these devices. Further, templated integrations can be supported that can allow new groups of devices to come online automatically configured. In various embodiments, data sources and data sinks can be conceptualized, which abstracts away from the standard "building blocks" of Kafka. Conceptually, the standard use of topics, producer ACLs, consumer ACLs and mirroring patterns are not utilized. Rather, in one embodiment, a source is defined in one group of devices (or system) and a sink is defined in another group of devices (or a different system) manages the configuration of core building blocks.

Figure 3:
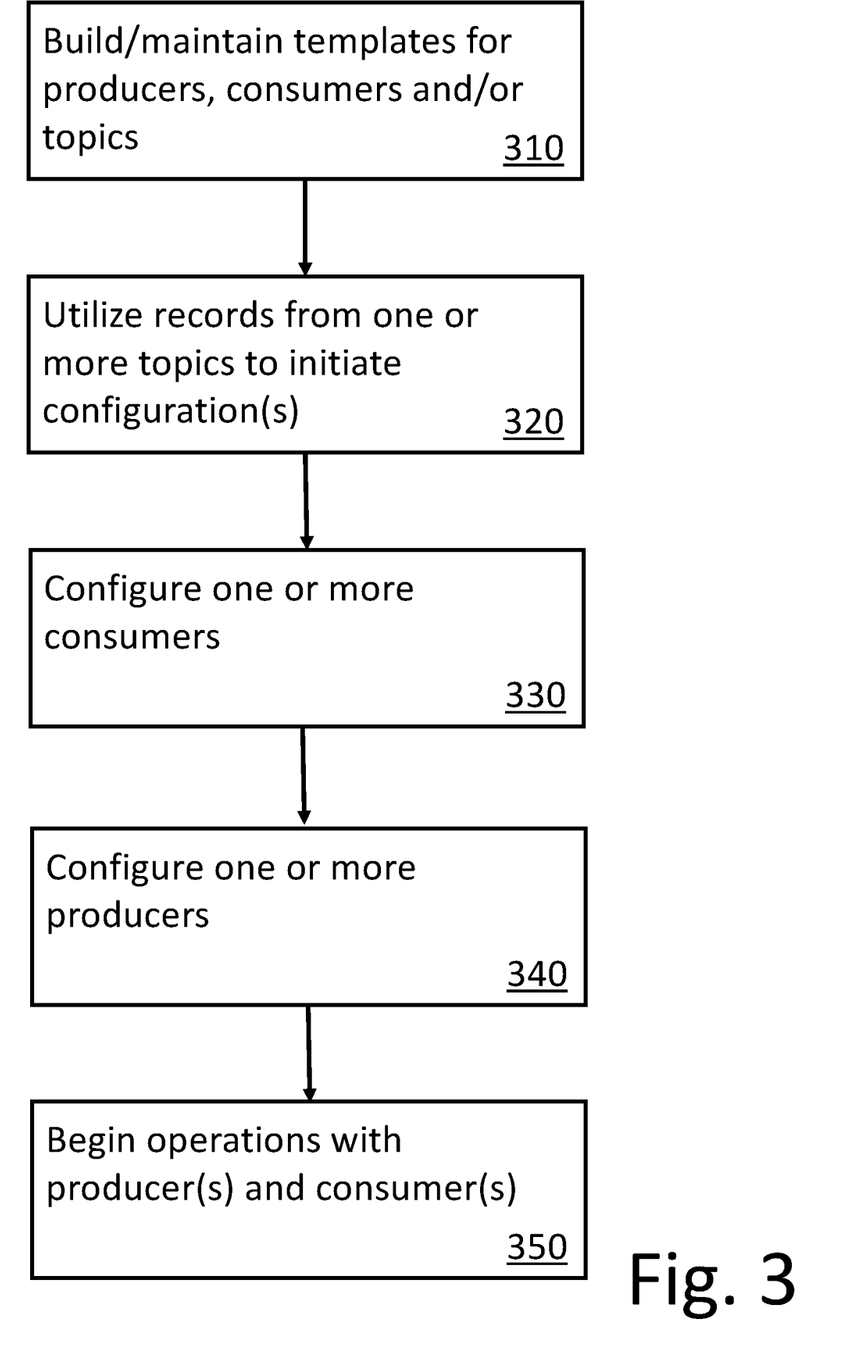
FIG. 3 is a flow diagram of one embodiment of a technique for managing configurations.

FIG. 3 is a flow diagram of one embodiment of a technique for managing configurations. The operations of FIG. 3 are illustrated and described in a particular order.

However, this ordering can be modified, for example, configuration of producers can be performed before or in parallel with configuration of consumers.

One or more templates can be built and/or maintained that can be utilized to configure producers, consumers and/or topics 310. These templates can be generated and maintained in any appropriate format. The templates can be used to define configurations or future states for any number of producers, consumers, topics and/or clusters.

As discussed above, producers and consumers of data can be defined by templates that can be applied globally or to one or more data centers that can require replication that can control accesses, which is a new control on data flows. Further, orchestration of, for example, topics within Kafka clusters (or similar) provides the ability to define future states. Thus, centralized application command and control can be provided. An example application of the techniques described herein can be utilized to support user self-service with respect to devices or groups of devices (e.g., data centers), which eliminates or reduces the need for manual administration of these devices.

In one embodiment, records from one or more topics can be utilized to initiate configurations, 320. As discussed above, templated integrations can be supported that can allow new groups of devices to come online automatically configured. In various embodiments, data sources and data sinks can be conceptualized, which abstracts away from standard techniques. Conceptually, in one embodiment, a source is defined in one group of devices (or system) and a sink is defined in another group of devices (or a different system) manages the configuration of core building blocks.

One or more consumer devices are configured using records from one or more topics, 330. Similarly, one or more producer devices are configured from one or more topics, 340. The configured producers, consumers, topics, etc. can begin operations once sufficiently configured, 350.

Figure 4:
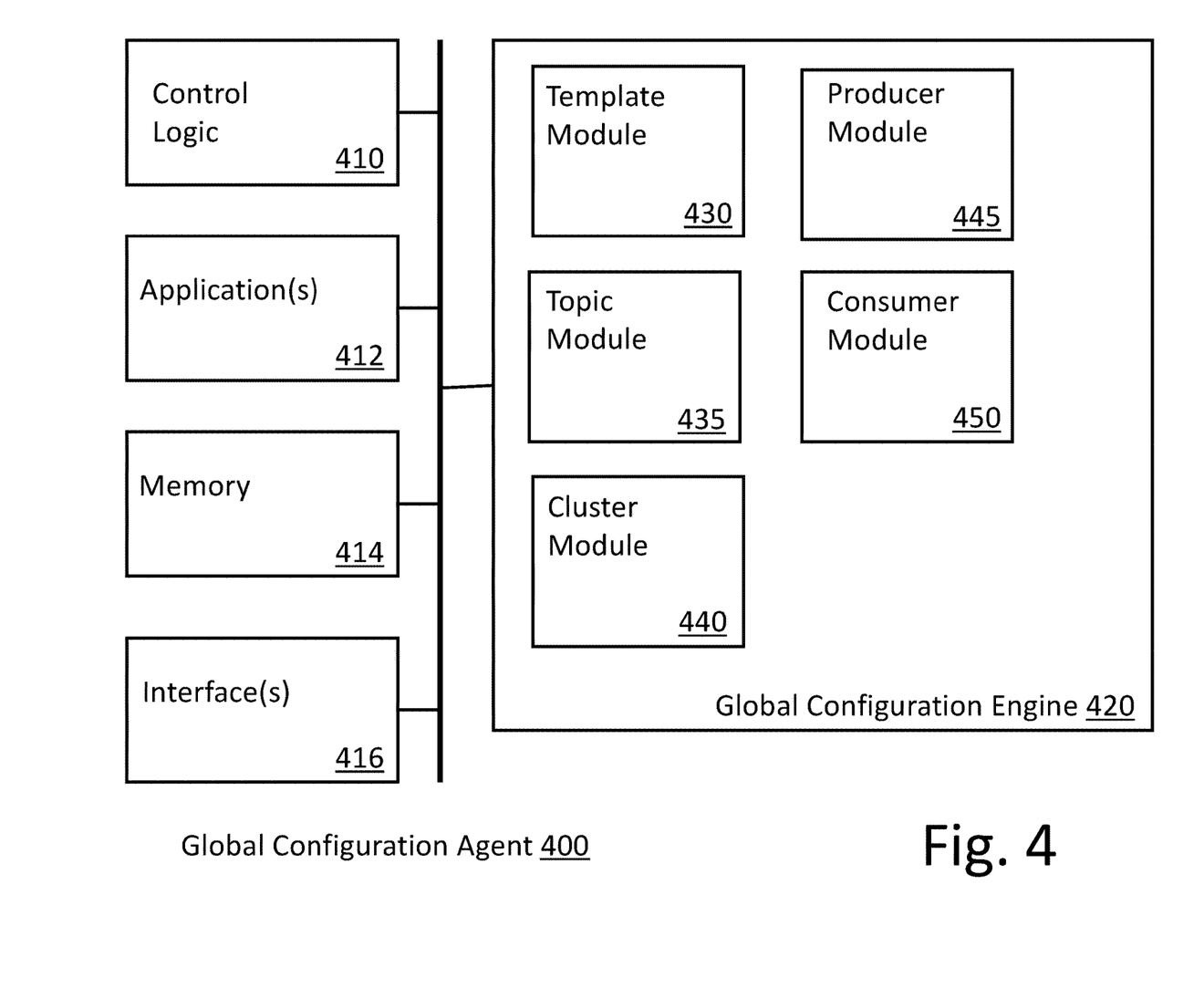
FIG. 4 is a block diagram of one embodiment of a global configuration agent.

FIG. 4 is a block diagram of one embodiment of a global configuration agent. In one embodiment, one or more global configuration agents may exist and/or operate within a host environment. The agent of FIG. 4 may provide functionality as described, for example, with respect to FIGS. 1-3. The agent of FIG. 4 may also provide additional functionality.

In one embodiment, global configuration agent 400 includes control logic 410, which implements logical functional control to direct operation of global configuration agent 400, and/or hardware associated with directing operation of global configuration agent 400. Logic may be hardware logic circuits and/or software routines. In one embodiment, global configuration agent 400 includes one or more applications 412, which represent a code sequence and/or programs that provide instructions to control logic 410.

Global configuration agent 400 includes memory 414, which represents a memory device and/or access to a memory resource for storing data and/or instructions. Memory 414 may include memory local to global configuration agent 400, as well as, or alternatively, including memory of the host system on which global configuration agent 400 resides. Global configuration agent 400 also includes one or more interfaces 416, which represent access interfaces to/from (an input/output interface) global configuration agent 400 with regard to entities (electronic or human) external to global configuration agent 400.

Global configuration agent 400 also includes global configuration engine 420, which represents one or more functions or modules that enable global configuration agent 400 to provide the functionality as described above. The example of FIG. 4 provides several modules that may be included in global configuration engine 420; however, different and/or additional modules may also be included. Example modules that may be involved in providing the functionality described herein include, for example, template module 430, topic module 435, cluster module 440, Producer module 445 and/or consumer module 450. Each of these modules may further include other sub-modules to provide other functions. As used herein, a module refers to routine, a subsystem, logic circuit, microcode, etc., whether implemented in hardware, software, firmware or some combination thereof.

In various embodiments, template module 430 can function to support creation and/or maintenance of templates to be utilized as described herein. For example, template module 430 can receive information via a graphical user interface (GUI, not illustrated in FIG. 4) that can provide parameters for future operations and/or desired future states to be achieved. Template module 430 can also maintain one or more templates in, for example, memory 414 which may include (or provide access to) a database.

In various embodiments topic module 435 can function to support creation and/or maintenance of one or more topics (e.g., within a Kafka cluster) that can be utilized to manage one or more records. In one embodiment, topic module 435 can function to manage created topics. In one embodiment, topic module 435 can function to configure topics based on one or more templates.

In various embodiments, cluster module 440 functions to support creation and/or maintain of one or more clusters (e.g., Kafka clusters) that can be utilized to manage one or more records. In one embodiment, cluster module 440 can function to manage and/or update created topics. In one embodiment, cluster module 440 can function to configure topics based on one or more templates.

In various embodiments, producer module 445 functions to support creation and/or operation of one or more producers that can be function to produce one or more records. In one embodiment, producer module 445 can function to create records for configuration of other devices and/or be configured to produce records for one or more topics.

In various embodiments, consumer module 450 functions to support creation and/or operation of one or more consumers that can be function to consume one or more records. In one embodiment, consumer module 450 can function to consume records for configuration of devices and/or be configured to consume records from one or more topics.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, cause the one or more processors to:
maintain at least one template having definitions for managing production and consumption of data within a group of computing resources, the definitions defining configuration information for a set of sources, a set of sinks, and a set of topics within the group of computing resources;
utilize records organized by topic collected from multiple disparate producers to initiate configuration of the group of computing resources, wherein records within a topic are organized by a corresponding topic sequence;
configure a first configuration for at least a first portion of the computing resources as consumers based on a definition of the set of sinks and a definition in the set of topics in the at least one template, the consumers to consume records at a pace independent of record production, wherein the set of sinks spans the first portion;
configure a second configuration for at least a second portion of the computing resources as producers based on a definition of the set of sources and a definition in the set of topics in the at least one template, the producers to produce records at a pace independent of record consumption, wherein the first portion is different from the second portion and wherein the set of sources spans the second portion; and
responsive to an addition of a new computing resource to the group of computing resources, detect at least one difference between an actual and desired state of the new computing resource, and remediate the at least one difference by updating the new computing resource with the set of topics to support the set of sources and the set of sinks.

2. The non-transitory computer-readable medium of claim 1 wherein the at least one template further includes definitions for at least one topic partition to be used for the production and consumption of data.

3. The non-transitory computer-readable medium of claim 1 wherein the at least one template comprises at least one parameter to cause one or more producer topics to be created in a local cluster that is local to the set of sources.

4. The non-transitory computer-readable medium of claim 1 wherein the at least one template comprises at least one producer access control list (ACL) for a cluster local to the set of sources.

5. The non-transitory computer-readable medium of claim 1 wherein the at least one template comprises at least one parameter to cause one or more topics to be created in an aggregator local to the consumers.

6. The non-transitory computer-readable medium of claim 1 wherein the at least one template comprises at least one access control list (ACL) for a data replication engine.

7. The non-transitory computer-readable medium of claim 1 wherein the at least one template comprises at least one consumer access control list (ACL) for cluster local to the set of sinks.

8. A system comprising:
a memory system; and
at least one hardware processor coupled with the memory system, the at least one hardware processor configurable to:
maintain at least one template having definitions for managing production and consumption of data within a group of computing resources, the definitions defining configuration information for a set of sources, a set of sinks, and a set of topics within the group of computing resources,
utilize records organized by topic collected from multiple disparate producers to initiate configuration of the group of computing resources, wherein records within a topic are organized by a corresponding topic sequence,
configure a first configuration for at least a first portion of the computing resources as consumers based on a definition of the set of sinks and a definition in the set of topics in the at least one template, the consumers to consume records at a pace independent of record production, wherein the set of sinks spans the first portion,
configure a second configuration for at least a second portion of the computing resources as producers based on a definition of the set of sources and a definition in the set of topics in the at least one template, the producers to produce records at a pace independent of record consumption, wherein the first portion is different from the second portion and wherein the set of sources spans the second portion, and
responsive to an addition of a new computing resource to the group of computing resources, detect at least one difference between an actual and desired state of the new computing resource, and remediate the at least one difference by updating the new computing resource with the set of topics to support the set of sources and the set of sinks.

9. The system of claim 8 wherein the at least one template further includes definitions for at least one topic partition to be used for the production and consumption of data.

10. The system of claim 8 wherein the at least one template comprises at least one parameter to cause one or more producer topics to be created in a local cluster that is local to the set of sources.

11. The system of claim 8 wherein the at least one template comprises at least one producer access control list (ACL) for a cluster local to the set of sources.

12. The system of claim 8 wherein the at least one template comprises at least one parameter to cause one or more topics to be created in an aggregator local to the consumers.

13. The system of claim 8 wherein the at least one template comprises at least one access control list (ACL) for a data replication engine.

14. The system of claim 8 wherein the at least one template comprises at least one consumer access control list (ACL) for a cluster local to the set of sinks.

15. A method comprising:
maintaining at least one template having definitions for managing production and consumption of data within a group of computing resources, the definitions defining configuration information for a set of sources, a set of sinks, and a set of topics within the group of computing resources;
utilizing records organized by topic collected from multiple disparate producers to initiate configuration of the group of computing resources, wherein records within a topic are organized by a corresponding topic sequence;
configuring a first configuration for at least a first portion of the computing resources as consumers based on a definition of the set of sinks and a definition in the set of topics in the at least one template, the consumers to consume records at a pace independent of record production, wherein the set of sinks spans the first portion;

configuring a second configuration for at least a second portion of the computing resources as producers based on a definition of the set of sources and a definition in the set of topics in the at least one template, the producers to produce records at a pace independent of record consumption, wherein the first portion is different from the second portion and wherein the set of sources spans the second portion; and responsive to an addition of a new computing resource to the group of computing resources, detect at least one difference between an actual and desired state of the new computing resource, and remediate the at least one difference by updating the new computing resource with the set of topics to support the set of sources and the set of sinks.

16. The method of claim 15 wherein the at least one template further includes definitions for at least one topic partition to be used for the production and consumption of data.

17. The method of claim 15 wherein the at least one template comprises at least one parameter to cause one or more producer topics to be created in a local cluster that is local to the set of sources.

18. The method of claim 15 wherein the at least one template comprises at least one producer access control list (ACL) for a cluster local to the set of sources.

19. The method of claim 15 wherein the at least one template comprises at least one parameter to cause one or more topics to be created in an aggregator local to the consumers.

20. The method of claim 15 wherein the at least one template comprises at least one access control list (ACL) for a data replication engine.

21. The method of claim 15 wherein the at least one template comprises at least one consumer access control list (ACL) for a cluster local to the set of sinks.

* * * * *